(12) United States Patent
Jagathesan et al.

(10) Patent No.: US 7,603,487 B2
(45) Date of Patent: Oct. 13, 2009

(54) HARDWARE CONFIGURABLE HUB INTERFACE UNIT

(75) Inventors: Shoban Srikrishna Jagathesan, Murphy, TX (US); Sanjive Agarwala, Richardson, TX (US); Raguram Damodaran, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 700 days.

(21) Appl. No.: 11/128,680

(22) Filed: May 13, 2005

(65) Prior Publication Data

US 2006/0259569 A1 Nov. 16, 2006

(51) Int. Cl.
G06F 3/00 (2006.01)
G06F 13/00 (2006.01)
G06F 13/12 (2006.01)

(52) U.S. Cl. .................. 710/8; 710/1; 710/2; 710/5; 710/10; 710/14; 710/52; 710/62; 710/63; 710/64; 710/72; 710/73; 710/74; 710/110; 710/305; 710/306; 710/310

(58) Field of Classification Search ............ None
See application file for complete search history.

(56) References Cited

U.S. PATENT DOCUMENTS 5,497,498 A * 3/1996 Taylor ................. 710/104
6,496,740 B1 * 12/2002 Robertson et al. ........... 700/20
6,587,995 B1 * 7/2003 Duboc et al. ................ 716/4
6,594,713 B1 * 7/2003 Fuoco et al. ............... 710/31
6,604,161 B1 * 8/2003 Miller ..................... 710/260
6,694,385 B1 * 2/2004 Fuoco et al. ................ 710/8
7,000,213 B2 * 2/2006 Banerjee et al. ............ 716/18
7,228,509 B1 * 6/2007 Dada et al. ................. 716/1
2002/0078269 A1 * 6/2002 Agarwala et al. .......... 710/22
2005/0149898 A1 * 7/2005 Hakewill et al. ........... 716/18
2006/0259568 A1 * 11/2006 Jagathesan et al. ........ 709/213

* cited by examiner

Primary Examiner—Tanh Q Nguyen
(74) Attorney, Agent, or Firm—Robert D. Marshall, Jr.; Wade J. Brady, III; Frederick J. Telecky, Jr.

(57) ABSTRACT

A data transfer apparatus with hub and ports includes design configurable hub interface units (HIU) between the ports and corresponding external application units. The configurable HIU provides a single generic superset HIU that can be configured for specific more specialized applications during implementation as part of design synthesis. Configuration allows the super-set configurable HIU to be crafted into any one of several possible special purpose HIUs. This configuration is performed during the design phase and is not applied in field applications. Optimization aimed at eliminating functional blocks not needed in a specific design and simplifying and modifying other functional blocks allows for the efficient configuring of these other types of HIUs. Configuration of HIUs for specific needs can result in significant savings in silicon area and in power consumption.

14 Claims, 2 Drawing Sheets

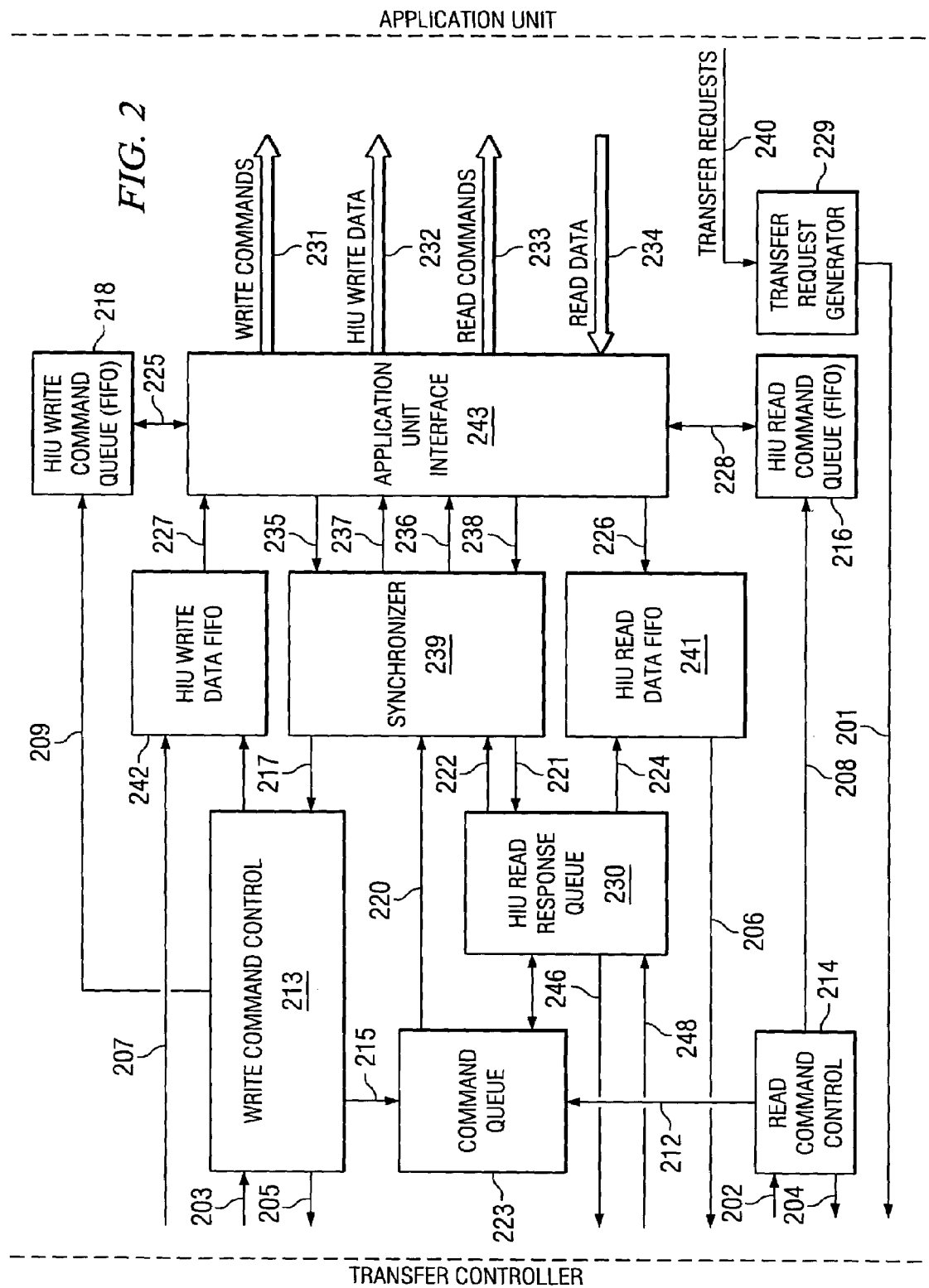

HARDWARE CONFIGURABLE HUB INTERFACE UNIT

TECHNICAL FIELD OF THE INVENTION

The technical field of this invention is direct memory access units in data processing devices.

BACKGROUND OF THE INVENTION

Current microprocessor designs need to centralize data transfer operations under control of integrated functional units known as data transfer access units or enhanced direct memory access (EDMA) units. EDMA is of most interest here and specifically of interest are EDMA designs employing hub-and-port style architecture. Such EDMAs feature a hub unit, which maintains a queue of transfer requests and provides priority protocol and proper interfacing for the handling of a large number of such requests. Secondly hub-and-port EDMAs have one or more hub interface units (HIU), which each provide a seamless interface between the EDMA hub and its ports. Ports are typically external application units (AU) otherwise known as peripheral units. Internal memory ports are also included among the EDMA ports.

FIG. 1 illustrates the essentials of a prior art microprocessor system having EDMA 100 and central processing unit (CPU) 101. EDMA 100 includes transfer controller 102 and hub interface units (HIU) 104, 105, and 106. Communication between the transfer controller hub unit 102 and HIUs 104, 105, and 106 employs buses 103, 107, 108, 109, and 110. Each HIU provides interface to a single port. Peripheral unit 114 and 115 communication with corresponding HIUs 104 and 105 via respective paths 111 and 112. The microprocessor system also includes the internal memory port device 116 which communications with HIU 106 via path 113. The EDMA 100 responds to transfer requests not only from CPU 101 but also from any of the ports it services. Transfer requests (TR) handled by transfer controller (TC) hub unit 102 involve transfer of data from one port to another. Transfer commands reside in transfer request packets that give all the detailed parameters of a transfer.

There are a variety of hub interface units (HIU) designed to have a range of capabilities and performance characteristics. Among these are: (1) synchronous HIU; (2) asynchronous HIU; (3) master HIU; (4) slave HIU; (5) full word 32-Bit HIU; (6) double word 64-Bit HIU; and (7) internal memory port (IMP) which is sometimes referred to as a fast port. An HIU must be designed to provide the most efficient data transfer with maximum bandwidth and minimal latency for the attached port. Providing this variety of HIU needed in various designs increases the scope of design and verification tasks. Clearly, any methodology that simplifies the design of multiple HIUs that reduces design time and simplifies verification is most desirable.

SUMMARY OF THE INVENTION

The hardware-configurable HIU of this invention provides a single generic superset HIU that can be configured for specific more specialized applications upon implementation during design synthesis. Hardware configuration allows the super-set hardware configurable HIU to be crafted into any one of several possible special purpose HIUs. Each configuration is completed and fixed during the design phase. This optimization is aimed at eliminating functional blocks not needed in a specific design and simplifying and modifying other functional blocks allowing for the efficient configuring of these other types of HIUs. In earlier HIU methodology the read and write data FIFO parameters were configurable using generic VHDL statements. This invention extends that concept of configuration to additional design parameters. Hardware configuration of HIUs for specific needs can result in significant savings in silicon area and in power consumption.

BRIEF DESCRIPTION OF THE DRAWINGS

These and other aspects of this invention are illustrated in the drawings, in which:

FIG. 2 illustrates the high level functional diagram of the configurable superset hub interface unit (HIU) providing interface between the EDMA transfer controller and one or more external peripheral units.

DETAILED DESCRIPTION OF PREFERRED EMBODIMENTS

Figure 1:
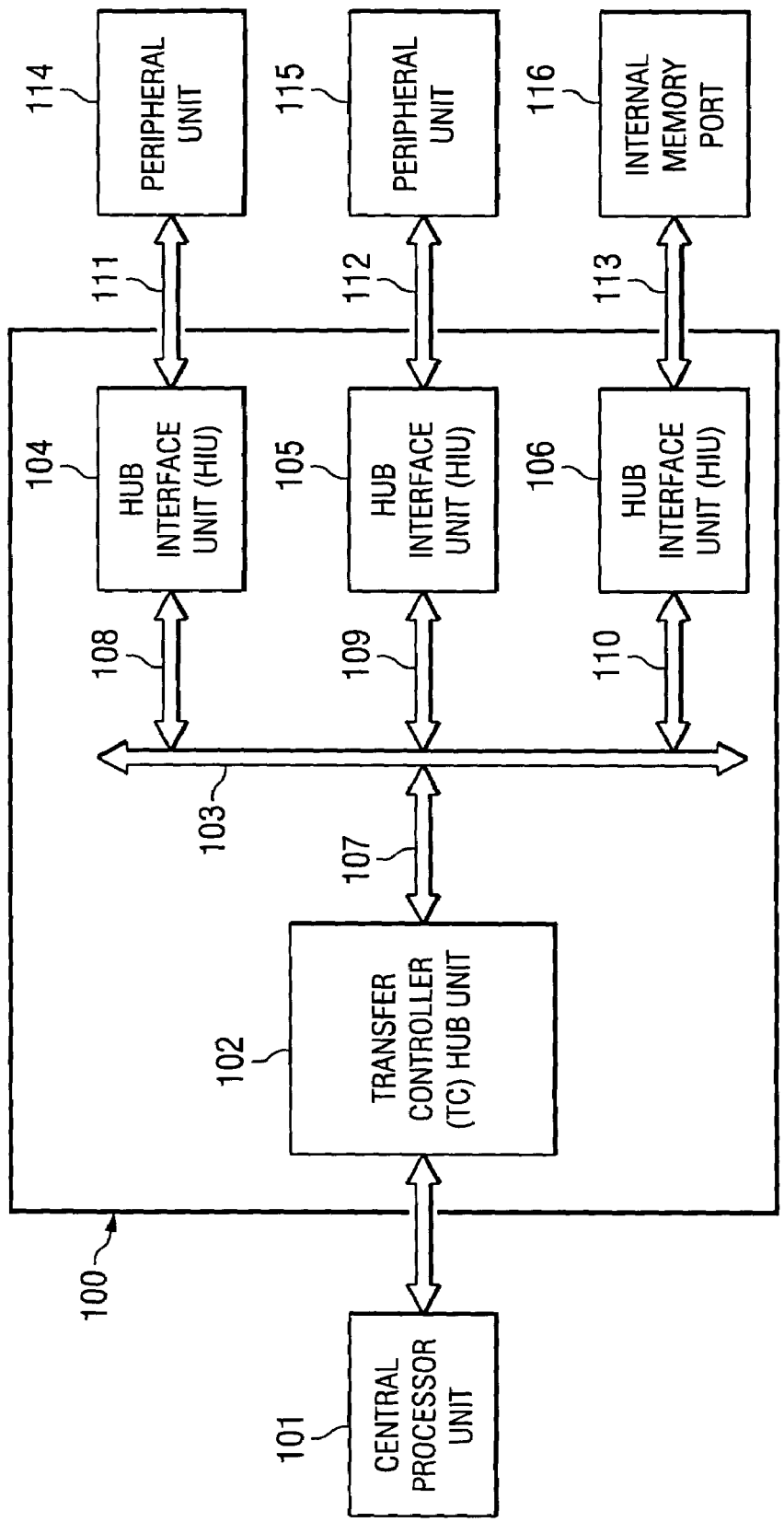
FIG. 1 illustrates the high level functional diagram of an enhanced direct memory access unit EDMA with hub-and-port architecture driven by a central processor unit and interfacing with several ports driving peripheral unit functions (Prior Art)

The hardware-configurable HIU of this invention provides a single generic superset HIU that can be configured for specific more specialized applications upon implementation during design synthesis. Hardware configuration allows the super-set hardware configurable HIU to be crafted into any one of several possible special purpose HIUs. Each configuration is completed and fixed during the design phase. This optimization is aimed at eliminating functional blocks not needed in a specific design and simplifying and modifying other functional blocks allowing for the efficient configuring of these other types of HIUs.

The hardware-configurable HIU of this invention provides interface between the transfer controller of an Enhanced DMA (EDMA) and external peripherals. FIG. 2 illustrates the high-level block diagram of the hub interface unit/application unit interface (HIU/AUI) portion of an EDMA having a full range of operating features. Each hardware block of the HIU is synthesized from a functional description (e.g. VHDL) and this functional description contains interactive code called configuration switches. The designer may interact with these switches to customize the design. The designer must qualify each configuration switch by entering the parameter constants required. These configuration switch constants are described in detail below.

The superset HIU illustrated in FIG. 2 includes a command queue 223 controlling read and write command operations. The HIU processes read commands entering via read command input 202 in read command control 214. Read command control 214 acknowledges receipt of a read command via read queue increment signal 204, which enables the transfer controller hub unit 102 to track the number of queued read commands. Read command control 214 drives read command queue FIFO 216 via path 208. Read command queue FIFO 216 stores all read commands the transfer controller has issued. Data read from a peripheral device via path 234, application unit interface (AUI) 243 and path 226 is stored in HIU read data FIFO 241. HIU read data FIFO 241 passes this read data to TC hub unit 102 via path 206. Configuration of the read functions 214, 216, and 241 during design synthesis determines the detailed structure of the read portion of the HIU for address, priority and number-of-word parameters.

The HIU processes write commands entered via write command input 203 in write command control 213. Write command control 213 acknowledges receipt of a write command via write queue increment signal 205, which enables the transfer controller hub unit 102 to track the number of queued write commands. Write command control 213 drives HIU write command queue FIFO 218 via path 209. HIU write command queue FIFO 218 stores all write commands the transfer controller has issued. Write data to be written to the application unit received from the transfer controller via path 207 is stored in HIU write data FIFO 242. Configuration of the write functions 213, 218 and 242 during design synthesis determines the detailed structure of write portion of the HIU for address, priority and number-of-word parameters.

HIU read response queue 230 keeps track of read responses from the application unit. HIU read response queue 230 is in communication with command queue 223 and HIU read data FIFO 224. HIU read response queue 230 supplies a read response signal 246 to TC hub unit 102 indicative of the receipt of read data from the application unit. HIU read response queue 230 receives a read response acknowledge signal 248 from TC hub unit 102. HIU read response queue 230 communicates with the application unit via signals 221 and 222, synchronizer 239 and application unit interface 243.

Synchronizer 239 performs the timing interface between the HIU and the AUI clock domains through signals 217, 220, 221, and 222 on the HIU side and through signals 235, 236, 237, and 238 on the AUI side.

AU interface 243 provides the connection to the application unit. AU interface 243 supplies write commands 231, HIU write data 232 and read commands 233 to the application unit. AU interface 243 receives read data 234 from the application unit. As discussed above, AU interface 243 is coupled to synchronizer 239 via signals 235, 236, 237 and 238.

In some configurations the application unit may generate transfer requests. In this is permitted, the configurable HIU receives transfer requests 240 in transfer request generator 229. Transfer request generator 229 passes these to transfer controller hub unit 102 via path 201.

The interface between AU interface 243 and read command queue FIFO 216 is via command path 228. The interface between AU interface 243 and HIU read data FIFO 241 is via data path 226. The interface between AU interface 243 and HIU write command queue 218 is via command path 225. The interface between AU interface 243 and HIU write data FIFO 242 is via data path 227. Table 1 lists a summary of major HIU signals.

TABLE 1

| Signal | Description | Interface |
|---|---|---|
| 201 | Transfer Request to Transfer Controller | HIU to TC |
| 202 | Transfer Controller (TC) READ Command | TC to HIU |
| 203 | Transfer Controller (TC) WRITE Command | TC to HIU |
| 204 | TC Read Queue Increment | HIU to TC |
| 205 | TC Write Queue Increment | HIU to TC |
| 206 | HIU to TC read data Out | HIU to TC |
| 207 | TC to HIU write data In | TC to HIU |
| 231 | Write Commands | AUI to peripheral |
| 232 | Write Data | AUI to peripheral |
| 233 | Read Commands | AUI to peripheral |
| 234 | Read Data | peripheral to AUI |
| 240 | Transfer Requests | peripheral to HIU |
| 246 | Read Response | HIU to TC |
| 248 | Read Response Acknowledge | TC to HIU |

Normally only one peripheral unit is serviced by an HIU and its corresponding application unit interface. The main functionality of the HIU involves the transfer of data from the EDMA transfer controller hub 102 to the peripherals and from the peripherals to the EDMA transfer controller hub 102. However, an additional extremely important function of HIU is temporary data storage that prevents the EDMA from being throttled by slow peripherals. Because the HIU normally operates between two independent clock domains, that of the CPU clock and that of the application unit interface clock, synchronization of these clock domains is also crucial.

Read command queue FIFO 216 and write command queue FIFO 218 are included to satisfy the demanding requirements placed on the HIU. Read command queue FIFO 216 and write command queue FIFO 218 are tightly controlled by command queue 223. Command queue 223 establishes the protocol behaviors of both read command and write command structure. The transfer controller portion of the EDMA issues write and read commands that carry a priority level. In addition a large group of words may be transferred by an issued command and then interrupted by other commands before being resumed and completed. The HIU includes in the write command queue 218 a number of reservation stations to accomplish the complex housekeeping required of the EDMA. The parameters for these reservation stations (e.g. number of words per station and width of words) are determined during design synthesis.

Reservation stations include a number of registers that store, track and control the transfer of data in situations wherein several data transfers are proceeding at more than one priority. HIU write command queue FIFO 218 and in write command control 213 include hardware for reservation stations tracking and control. HIU write data FIFO 242 includes hardware for reservation station data storage. The configuration of some HIU types strongly affects the structure and number of reservation stations.

Various new peripherals are being included in current system designs to provide performance and functionality improvements. Each new peripheral must also have an HIU capable of extracting maximum performance. Clearly, using a design which includes a superset of the functional features of all types of HIU and is programmable to customize specific HIUs is desirable.

The hardware configurable HIU of this invention achieves this goal. The HIU can be made to have characteristics that optimally match the needs of the peripheral. The preferred embodiment of this invention includes nine hardware configuration switches for HIU configuration. Table 2 illustrates the actions of these nine configuration switches used in the hardware configurable HIU.

TABLE 2

| Configuration Switch | Functions/Signals Affected | Further Description |
|---|---|---|
| Master-Slave HIU MS_HIU | No Configuration Required | Master-Slave HIU is superset of all HIUs |
| Master Only HIU MO_HIU | Transfer Request Generator 229 | Transfer Request Generator 229 Eliminated |
| Slave Only HIU SO_HIU | Read Command Queue FIFO 216 | Read Command Queue FIFO 216 Eliminated |
| Fast Port HIU FP_HIU | Major Changes in Write Command Control 213 | Reservation Stations Eliminated; All data comes in a single transaction and is sent directly to AUI through Write Data FIFO 242 |
| Number of Write Commands | Write Command Control 213, Command Queue 223 | Reconfiguration of Synchronizer 239 and AU Interface 243 |

TABLE 2-continued

| Configuration Switch | Functions/Signals Affected | Further Description |
|---|---|---|
| Num_WR Number of Read Commands Num_RD | Size Read Command Control 214, Command Queue 223 Size | Reconfiguration of Synchronizer 239 and AU Interface 243 |
| EDMA Data Bus Width EDMA_BW | Write Data FIFO 242 Width, Read Data FIFO 241 Width, AU Interface 243 | Reconfigures EDMA Address Signal 244 |
| AU Data Bus Width AU_BW | AU Interface 243 | Reconfigures HIU Write Data 232 and HIU Read Data 234 |
| AU Bus Protocol AU_BP | AU Interface 243, Transfer Request Generator 229 | Reconfigures Signals 231, 232, and 233 to specific Bus Protocols; Reconfigures Transfer Request Generator 229 |

These switches exist as VHDL code lines customized by the designer once the exact device function is determined. These lines of configuration switch code are used during VHDL compile to extract the exact functionality required on a custom designed HIU. The compile step not only selects and customizes the functionality to suit the design, but acts to perform a clean-up operation by removing and superfluous logic or signal routing from the design. For example, no gates remain that are not connected at input and output nodes. Unconnected routing lines are also eliminated.

The nine configuration switches of the preferred embodiment as described below.

1) Master-Slave HIU (MS_HIU): When active this configuration switch MS_HIU gives the default configuration with all hardware blocks having their full functionality. In this default state, selection of configuration constant entries may still alter certain parameters such as word size and number of words.

2) Master-Only HIU (MO_HIU): When active this configuration switch MO_HIU causes the HIU to be the master and issue read and write commands to a slave application unit. When active configuration switch MO_HIU eliminates the transfer request generator 229, which is not used in the master HIU configuration. Control logic within both write command control 213 and read command control 214 indicate that a master command has been issued based on the appropriate address and acts to adjust respective addresses accordingly. When active configuration switch MO_HIU modifies the logic within read command control 214 for the master-only HIU. When active configuration switch MO_HIU also modifies the I/O structure for master only operation.

3) Slave-Only HIU (SO_HIU): When active the slave-only configuration switch SO_HIU enables the application unit to be the master and issue read and write commands to the slave-only HIU. When active the slave-only configuration switch SO_HIU causes the HIU to generate transfer requests (TRs) based on the master VBUS commands it receives from the slave application unit. When active configuration switch SO_HIU also modifies the I/O structure for slave-only operation.

4) Fast port HIU (FP_HIU): The fast port HIU is activated by configuration switch FP_HIU. This mode is used if the entire write can be completed in a single write command, i.e. 4 words (128 bit bus width). When active the fast port HIU configuration switch FP_HIU eliminates all write reservation stations inside the HIU. These write reservation stations are replaced by less complex write buffers. This results in an area saving of more than 30% in the HIU. This also results in considerable power savings.

5) Number of write commands (NUM_WR): The HIU can be configured via configuration switch Num_WR to handle a programmable number of write commands. This also selects a programmable number of write reservation stations and a programmable number of command queue (read and write queues) slots.

6) Number of read commands (NUM_RD): The HIU can be configured via configuration switch Num_RD to handle a programmable number of read commands.

7) EDMA data bus width (EDMA_BW): The HIU can be configured via configuration switch EDMA_BW to a selectable data bus width. The selected data bus width can be 128-Bits, 64-Bits or 32-Bits wide. This enables the HIU to be connected to any peripheral of one-word (32-bits), two-word (64-bits) or four-word (128-bits) data bus widths. The bus width on the EDMA can also be chosen to maximize the bandwidth when the EDMA is connected to any one of other types of peripherals.

8) Application unit data bus width (AU_BW): The HIU can be configures via configuration switch AU_BW to a selectable data bus width on the AU interface. The selected data bus width can be 128-Bits, 64-Bits or 32-Bits wide. This enables the HIU to be connected to any peripheral of one-word (32-bits), two-word (64-bits) or four-word (128-bits) data bus widths. The bus width on the AU can also be chosen to maximize the bandwidth when the EDMA is connected to any one of other types of peripherals.

9) AU Bus Protocol (AU_BP): The AU-Bus interface can be configured via configuration switch AU_BP. This allows for VBUS1.0, VBUS2.0, VBUS3.0 or other possible types of interfaces. The configuration switch AU_BP selects this functionality by placing the required implementation circuits in AU interface 243.

Table 3 relates the nine configuration switches to their use in crafting the various HIU types covered by the configuration process.

TABLE 3

| HIU Type | Switches Active | Switch Constant Value |
|---|---|---|
| ALL | Read Data FIFO Size, Write Data FIFO Size | Range 2 through 8 Range 2 through 8 |
| Master-Slave HIU Default Configuration | Master-Slave HIU MS_HIU | Configures Full Complement of HIU Functions |
| Master-Only HIU | Master-Only HIU MO_HIU | Configures HIU without Transfer Request Generator |
| Slave Only HIU | Slave Only HIU SO_HIU | Configures HIU without HIU Read Request Queue |
| Fast Port HIU | Write Commands Num_WR | Defaults to 2 |
| Programmable number of write commands | Write Commands Num_WR | Range 2 through 8 |
| Programmable number of read commands: | Read Commands Num_RD | Range 2 through 8 |
| Programmable data width on the EDMA interface | EDMA Data Bus Width EDMA_BW | Three Choices: 32 Bits; 64 Bits; 128 Bits |

TABLE 3-continued

| HIU Type | Switches Active | Switch Constant Value |
|---|---|---|
| Programmable data width on the AU interface | AU Data Bus Width AU_BW | Three Choices: 32 Bits; 64 Bits; 128 Bits |
| Configurable for VBUS1.0, VBUS2.0, VBUS3.0 | HIU-AU Bus Protocol AU_BP | Range 0 through 2<br>0 = Vbus 1.0<br>1 = Vbus 2.0<br>2 = Vbus 3.0 |

What is claimed is:

1. In a data transfer controller having a central hub connected to a plurality of ports, each port connected to a hub interface unit adapted for connection to an external application unit, a method of design configuration of each hub interface unit comprising the steps of:
designing a hub interface unit circuit having a superset of a range of operating features via functional description, said range of operating features including
at least one common unit used in each hub interface unit;
said at least one common unit being configurable in size or function via at least one corresponding configuration switch;
one or more optional units to each hub interface unit; and
selecting a particular optional unit from among the plurality of optional units via at least one corresponding configuration switch;
for each hub interface unit in the data transfer controller
determining desired operating features from among said range of operating features;
selecting configuration switches corresponding to said desired operating features; and
compiling a circuit in said functional description corresponding to a circuit obtained as a result of said selected configuration switches in the hub interface unit circuit; and
for each hub interface unit in the data transfer controller synthesizing a circuit corresponding to said compiled circuit.

2. The method of claim, 1 wherein:
said one or more optional units includes a transfer request generator adapted for connection to the external application unit and said central hub and operable to receive signals from the external application unit and transmit a data transfer request to said central hub unit; and
said step of compiling a circuit in said functional description
configures said hub interface unit as a master only hub interface unit by optionally not providing said transfer request generator in response to an active state in a master-only hub interface unit configuration switch,
configures said hub interface unit as a slave only hub interface unit by optionally providing said transfer request generator in response to an active state in a slave-only hub interface unit configuration switch, and
configures said hub interface unit as a master/slave hub interface unit by optionally providing said transfer request generator in response to an active state in a master-slave hub interface unit configuration switch.

3. The method of claim, 1 wherein:
said one or more optional units includes a read command queue FIFO connected to said central hub unit and operable to store read commands issued by said central hub until issue to the external application unit; and
said step of compiling a circuit is said functional description
configures said hub interface unit as a master only hub interface unit by optionally providing said read command queue FIFO,
configures said hub interface unit as a slave only hub interface unit by optionally not providing said read command queue FIFO, and
configures said hub interface unit as a master/slave hub interface unit by optionally providing said read command queue FIFO.

4. The method of claim 1, wherein:
said one or more optional units includes a write reservation station connected to said central hub unit and operable to store write data issued by said central hub until issue to the external application unit; and
said step of compiling a circuit in said functional description configures said hub interface unit as a fast port hub interface unit by optionally providing no write reservation station.

5. The method of claim 1, wherein:
said step of compiling a circuit in said functional description configures said hub interface unit as a slow port hub interface unit by optionally providing a selectable number of write reservation stations.

6. The method of claim 1, wherein:
said at least one common unit includes a write command queue connected to said central hub and operable to store at least one write command issued by said central hub until issue to the external application unit; and
said step of compiling a circuit in said functional description includes providing said at least one common unit with a selectable write command queue depth corresponding to a state of a write command queue depth configuration switch.

7. The method of claim 6, wherein:
said step of providing said at least one common unit with a selectable write command queue depth provides a write command queue depth of between two and eight write commands.

8. The method of claim 1, wherein:
said at least one common unit includes a read command queue connected to said central hub and operable to store at least one read command issued by said central hub until issue to the external application unit; and
said step of compiling a circuit in said functional description includes providing said at least one common unit with a selectable read command queue depth corresponding to a state of a read command queue depth configuration switch.

9. The method of claim 8, wherein:
said step of providing said at least one common unit with a selectable read command queue depth provides a read command queue depth of between two and eight read commands.

10. The method of claim 1, wherein:
said at least one common unit includes a hub write data bus connected to said central hub and operable to receive write data from said central hub and a hub read data bus connected to said central hub and operable to supply read data to said central hub; and
configuring said at least one common unit includes providing a selectable data width on said hub write data bus and said hub read data bus.

11. The method of claim 10, wherein:

said step of providing a selectable data width on said hub write data bus and said hub read data bus selects from among the data widths of 32 bits, 64 bits and 128 bits.

12. The method of claim 1, wherein:

said at least one common unit includes an application unit write data bus connected to the external application unit and operable to supply write data to the external application unit and an application unit read data bus connected to the external application unit and operable to receive read data from the external application unit; and configuring said at least one common unit includes providing a selectable data width on said application unit write data bus and said application unit read data bus.

13. The method of claim 12, wherein:

said step of providing a data width on said application unit write data bus and said application unit read data bus selects from among the data widths of 32 bits, 64 bits and 128 bits.

14. The method of claim 1, wherein:

said at least one common unit includes an application unit interface connected to the external application unit and operable to supply write commands, write data and read commands to the external application unit and to receive read data from the external application unit; and configuring said at least one common unit includes providing said application unit interface with a selected one of predetermined number of pre-designed bus interfaces.

* * * * *

UNITED STATES PATENT AND TRADEMARK OFFICE
CERTIFICATE OF CORRECTION

PATENT NO.       : 7,603,487 B2                          Page 1 of 1
APPLICATION NO.  : 11/128680
DATED            : October 13, 2009
INVENTOR(S)      : Jagathesan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Fifth Day of October, 2010

David J. Kappos
*Director of the United States Patent and Trademark Office*